(12) United States Patent
Kumar et al.

(10) Patent No.: US 11,552,805 B2
(45) Date of Patent: Jan. 10, 2023

(54) CONNECTED VEHICLE COMMUNICATION WITH IMPROVED MISBEHAVIOR PROCESSING

(71) Applicant: OnBoard Security, Inc., San Diego, CA (US)

(72) Inventors: Virendra Kumar, Watertown, MA (US); William Whyte, Belmont, MA (US); Abhishek Jain, Baltimore, MD (US)

(73) Assignee: OnBoard Security, Inc., San Diego, CA (US)

( * ) Notice: Subject to any disclaimer, the term of this patent is extended or adjusted under 35 U.S.C. 154(b) by 382 days.

(21) Appl. No.: 16/350,582

(22) Filed: Dec. 3, 2018

(65) Prior Publication Data

US 2019/0245705 A1     Aug. 8, 2019

Related U.S. Application Data

(60) Provisional application No. 62/709,934, filed on Feb. 5, 2018.

(51) Int. Cl.
    *H04L 29/06*      (2006.01)
    *H04L 9/32*      (2006.01)
    (Continued)

(52) U.S. Cl.
    CPC .......... *H04L 9/3268* (2013.01); *H04L 63/062* (2013.01); *H04L 63/065* (2013.01);
    (Continued)

(58) Field of Classification Search
    CPC ... H04L 9/3268; H04L 63/065; H04L 63/062; H04L 63/0823; H04L 9/0643;
    (Continued)

(56) References Cited

U.S. PATENT DOCUMENTS

2013/0160086 A1\*   6/2013   Katar ..................... H04L 63/08
                                                                        726/4
2017/0222990 A1\*   8/2017   Romansky ............ H04L 9/3268

OTHER PUBLICATIONS

"Advanced Encryption Standard (AES)", Federal Information Processing Standards Publication 197, Nov. 26, 2001, 51 Pages.

(Continued)

*Primary Examiner* — Shewaye Gelagay
*Assistant Examiner* — Carlton Johnson
(74) *Attorney, Agent, or Firm* — Polsinelli LLP

(57) ABSTRACT

A form of the invention is applicable for use in conjunction with a security credential management system that produces and manages pseudonym digital certificates issued to vehicles and used by vehicles to establish trust in vehicle-to-vehicle communications, the security credential management system including a pseudonym certificate authority processor entity which issues pseudonym digital certificates to vehicles, a registration authority processor entity that validates, processes and forwards requests for pseudonym digital certificates to the pseudonym certificate authority processor entity, and a misbehavior authority processor entity that receives misbehavior reports from reporter vehicles that include information about the reporter vehicles and suspect misbehaving vehicles and is responsible for producing a list of revoked credentials; the pseudonym certificate processor entity and registration authority processor entity participating in producing linkage values to be contained within the issued pseudonym digital certificates, the linkage values being derived ultimately, using a one-way function, from linkage seeds thereby enabling, in predetermined circumstances, at least some of the certificates containing linkage values derived from a given linkage seed to be revoked. A method is set forth for improving operation of the security credential management system, including the following steps: in conjunction with deriving the linkage (Continued)

values from the linkage seeds, additionally producing encrypted linkage maps that relate, in encrypted form, linkage values with linkage seeds from which they are derived; determining particular linkage values deemed to be of interest based at least in part on information derived from misbehavior reports; and determining linkage seeds associated with the particular linkage values utilizing decryptions of the encrypted linkage maps.

30 Claims, 6 Drawing Sheets

(51) Int. Cl.
    *H04W 4/46*     (2018.01)
    *H04L 9/40*     (2022.01)
    *H04L 67/12*     (2022.01)

(52) U.S. Cl.
    CPC .......... *H04L 63/0823* (2013.01); *H04L 67/12* (2013.01); *H04W 4/46* (2018.02)

(58) Field of Classification Search
    CPC . H04L 2209/84; H04L 2209/38; H04L 27/12; H04L 2209/50; H04L 67/12; H04L 9/50; H04W 4/46; H04W 12/0802; H04W 4/40; H04W 12/082; H04W 12/122
    See application file for complete search history.

(56) References Cited

OTHER PUBLICATIONS

Albrecht M.R., et al., "Lucky Microseconds: A Timing Attack on Amazon's s2n Implementation of TLS", 2015, 30 Pages.
Ananth P., "Cryptography with Updates", 2016, pp. 0-68 (69 pp.).
Araki T., et al., "Optimized Honest-Majority MPC for Malicious Adversaries—Breaking the 1 Billion-Gate Per Second Barrier", IEEE Symposium on Security and Privacy (SP), 2017, 20 Pages.
Bellare M., et al., "Breaking and Provably Repairing the SSH Authenticated Encryption Scheme: A Case Study of the Encode-then-Encrypt-and-MAC Paradigm", ACM Transactions on Information and System Security, Mar. 21, 2004, pp. 1-33.
Bellare M., et al., "Efficient Garbling from a Fixed-Key Blockcipher", IEEE Symposium on Security and Privacy, May 19, 2013 (full paper), 34 Pages.
Ben-Efraim A., et al., "Efficient Scalable Constant-Round MPC via Garbled Circuits", International Conference on the Theory and Application of Cryptology and Information Security, Nov. 2017, 29 Pages.
Bittau A., et al., "The Final Nail in WEP's Coffin", IEEE Symposium on Security and Privacy, 2006, 15 Pages.
Boldyreva A., et al., "Provable-Security Analysis of Authenticated Encryption in Kerberos", IET Information Security, vol. 5, No. 4, Dec. 2011, pp. 1-25 (full version).
Boneh D., et al., "Constrained Pseudorandom Functions and Their Applications", International Conference on the Theory and Application of Cryptology and Information Security, Sep. 9, 2013, pp. 1-23.
Boyle E., et al., "Functional Signatures and Pseudorandom Functions", Oct. 29, 2013, 34 Pages.
Brecht B., et al., "A Security Credential Management System for V2X Communications", IEEE Transactions on Intelligent Transportation Systems, vol. 19, No. 12, Dec. 2018, pp. 3850-3871 (22 pp.).
Choi S.G., et al., "Efficient Three-Party Computation from Cut-and-Choose", Annual Cryptology Conference, 2014, pp. 513-530 (18 pp.).
Cleve R., "Limits on the Security of Coin Flips When Half the Processors are Faulty", STOC '86 Proceedings of the eighteenth annual ACM symposium on Theory of computing, 1986, pp. 364-369.
"Secure Hash Standard (SHS)", Federal Information Processing Standards Publication (FIPS PUB) 180-4, 2015, 36 Pages.
Franz M., et al., "CBMC-GC: An ANSI C Compiler for Secure Two-Party Computations", 2015, 5 Pages.
Franz M., et al., "Compilation for Secure Two-Party Computations", 2015, pp. 143-144.
Furukawa J., et al., "High-Throughput Secure Three-Party Computation for Malicious Adversaries and an Honest Majority", 2017, 36 Pages.
Goldreich O., et al., "A Completeness Theorem for Protocols with Honest Majority", Proceeding STOC '87 Proceedings of the nineteenth annual ACM symposium on Theory of computing, 1987, pp. 218-229.
Gueron S., et al., "Fast Garbling of Circuits Under Standard Assumptions", Jun. 13, 2017, pp. 1-46.
Huang Y., et al., "Amortizing Garbled Circuits", Annual Cryptology Conference, 2014, pp. 1-29.
Ishai Y., et al., "Secure Computation with Minimal Interaction, Revisited", Annual Cryptology Conference, 2015, 81 Pages.
Ishai Y., et al., "Secure Multi-Party Computation with Identifiable Abort", Annual Cryptology Conference, 2014, 37 Pages.
Ishai Y., et al., "Identifying Cheaters Without an Honest Majority", Theory of Cryptography Conference, 2012, pp. 21-38 (18 pp.).
Kiayias A., et al., "Delegatable Pseudorandom Functions and Applications", CCS '13 Proceedings of the 2013 ACM SIGSAC Conference on Computer and Communications Security, 2013, 27 Pages.
Kolesnikov V., et al., "FleXOR: Flexible garbling for XOR gates that beats free-XOR", Jun. 14, 2014, 24 Pages.
Kolesnikov V., et al., "Improved Garbled Circuit: Free XOR Gates and Applications", International Colloquium on Automata, Languages, and Programming, 2008, 12 Pages.
Lindell Y., et al., "A Proof of Security of Yao's Protocol for Two-Party Computation", Jun. 26, 2006, pp. 1-25.
Lindell Y., et al., "Blazing Fast 2PC in the Offine/Online Setting with Security for Malicious Adversaries", Oct. 12, 2015, CCS '15 Proceedings of the 22nd ACM SIGSAC Conference on Computer and Communications Security, pp. 1-32.
Lindell Y., "Fast Cut-and-Choose Based Protocols for Malicious and Covert Adversaries", Feb. 8, 2015, 33 Pages.
Lindell Y., "Fast Secure Two-Party ECDSA Signing", Annual International Cryptology Conference, Jul. 2017, 38 Pages.
Mohassel P., et al., "Fast and Secure Three-party Computation: The Garbled Circuit Approach", CCS '15 Proceedings of the 22nd ACM SIGSAC Conference on Computer and Communications Security, Oct. 2015, pp. 591-602 (12 pp.).
"National Highway Traffic Safety Administration", Federal Motor Vehicle Safety Standards; V2V Communications, NPRM, Federal Register, vol. 82, No. 8, Jan. 12, 2017, pp. 3854-4019 (166 pp.).
Paterson K.G., et al., "Reactive and Proactive Standardisation of TLS", International Conference on Research in Security Standardisation, 2016, 28 Pages.
"Processing personal data in the context of C-ITS", Data Protection WG of the C-ITS Platform, Jan. 3, 2017, 34 Pages.
Rabin M.O., "How to Exchange Secrets with Oblivious Transfer", May 20, 1981, 26 Pages.
Sahai A., et al., "How to Use Indistinguishability Obfuscation: Deniable Encryption, and More", STOC '14 Proceedings of the forty-sixth annual ACM symposium on Theory of computing, 2014, 39 Pages.
Wang X., et al., "Authenticated Garbling and Efficient Maliciously Secure Two-Party Computation", CCS '17 Proceedings of the 2017 ACM SIGSAC Conference on Computer and Communications Security, Oct. 30-Nov. 3, 2017, pp. 21-37.
Wang X., et al., "Faster Secure Two-Party Computation in the Single-Execution Setting", Annual International Conference on the Theory and Applications of Cryptographic Techniques, 2017, pp. 399-424 (26 pp.).

(56) References Cited

OTHER PUBLICATIONS

Wang X., et al., "Global-Scale Secure Multiparty Computation", CCS '17 Proceedings of the 2017 ACM SIGSAC Conference on Computer and Communications Security, 2017, pp. 1-35.
Whyte W., et al., "A Security Credential Management System for V2V Communications," 2013 IEEE Vehicular Networking Conference, XP032567195, 8 pages, DOI: 10.1109/VNC.2013.6737583 [retrieved on Feb. 11, 2014].
Wiki: "SCP2: Linkage Values", EE Requirements and Specifications Supporting SCMS Software Release 1.2, 2017, 3 Pages.
Yao A.C., "Protocols for Secure Computations", 23rd Annual Symposium on Foundations of Computer Science (SFCS 1982), Nov. 1982, pp. 1-5.
Zahur S., et al., "Two Halves Make a Whole" Reducing Data Transfer in Garbled Circuits using Half Gates, 34th Eurocrypt, Annual International Conference on the Theory and Applications of Cryptographic Techniques, Apr. 2015, 28 Pages.

* cited by examiner

CONNECTED VEHICLE COMMUNICATION WITH IMPROVED MISBEHAVIOR PROCESSING

RELATED APPLICATION

This application claims priority from U.S. Provisional Patent Application No. 62/709,934 filed Feb. 5, 2018, and said U.S. Provisional Patent Application is incorporated herein by reference.

FIELD OF THE INVENTION

This invention relates to the field of connected vehicle communication and, more particularly, to a system and technique for connected vehicle communication.

BACKGROUND OF THE INVENTION

A part of the background hereof is disclosed in W. Whyte, A. Weimerskirch, V. Kumar, and T. Hehn, "A Security Credential Management System For V2V Communications", IEEE Vehicular Networking Conference, 2013. (The security credential management system described therein is sometimes referred to as "SCMS.") The SCMS for vehicle-to-vehicle ("V2V") communication was developed under a cooperative agreement with the US Department of Transportation. The system issues digital certificates to participating vehicles for establishing trust among them, which is necessary for safety applications primarily crash-avoidance. It supports four main use cases, namely, bootstrapping, certificate provisioning, misbehavior reporting and revocation. A stated design goal thereof was to provide both security and privacy to the largest extent reasonable and possible. To achieve the latter, vehicles are issued pseudonym certificates, and the provisioning of those certificates is divided among multiple semi-autonomous "organizations". A stated challenge was to facilitate efficient revocation of certificates while providing security and privacy against attacks from insiders.

An important feature of the SCMS is that in order to support privacy against an insider at the SCMS (so that an insider can't tell which credentials belong to a particular vehicle, or even which credentials belong to each other) while still allowing a misbehaving vehicle to be identified and revoked, a complicated architecture has been put in place where no less than four SCMS component organizations (a Pseudonym Certificate Authority (PCA), a Registration Authority (RA), and two Linkage Authorities (LAs)) participate in issuing each certificate.

A challenge in a vehicle credential management system is to maintain the privacy of individual vehicles while still enabling efficient revocation of misbehaving vehicles. In the Security Credential Management System, SCMS provisions multiple, concurrently valid pseudonym certificates to each participating vehicle in the system. Each pseudonym certificate issued to a vehicle contains a random looking linkage value (as opposed to publicly identifiable information) that can be used for authentication. While the linkage value in each certificate is different, all the linkage values for a vehicle are derived from the same initial linkage seed. At any time, a "sufficient" number of pseudonym certificates are issued to each vehicle so that minimal "re-use" of a certificate is required. Intuitively, this is to ensure privacy of a vehicle across multiple authentications. The number of certificates and linkage values needed to be generated is obviously very large.

A vehicle's behavior may deviate from normal either due to malfunction (of some sensors, for example), or due to intentional misbehavior, and it may not always be easy to distinguish between the two. In SCMS a vehicle is, therefore, revoked only if it exhibits sustained abnormal behavior. In the SCMS, misbehavior identification involves an organization entity called Misbehavior Authority (MA) on top of the four organizations summarized above as being involved in linkage value generation and pseudonym certificate provisioning. At a high level, the MA collects misbehavior reports from vehicles. On a regular basis, it processes these reports and creates lists of pseudonym certificates that it wants to gather more information on. For suspect pseudonym certificates, it is primarily interested in knowing how many (and which) certificates belong to one vehicle, and for reporter pseudonym certificates, it wants to learn how many unique vehicles are present in a given set of pseudonym certificates. To this end, the MA sends linkage values to the PCA and gets back the corresponding pre-linkage values. Then, it sends those pre-linkage values to one of the Linkage Authorities (LAs) to get back correlations among them. Then, for vehicles that need to be revoked (as determined by the MA), it requests the corresponding linkage seeds for the current time period from both of the LAs, and publishes them on the Certificate Revocation List (CRL). Using the published seeds, anyone can generate all current and future (but not past) linkage values and compare them with the ones in the certificates to identify revoked vehicles.

As set forth in the Whyte et al., supra, SCMS paper, linkage information is required at the Misbehavior Authority (MA) to find whether multiple misbehavior reports point to the same vehicle. The following actions are stated to be required: (1) The PCA and both the LAs have to collaborate to determine external revocation information for the CRL; and (2) The PCA and the RA have to collaborate to determine the enrollment certificate of the misbehaving device for an internal blacklist. The following is the step-by-step description from the paper of the process of identifying the linkage seeds and the enrollment certificate corresponding to a pseudonym certificate, it being noted that some of the communications in the steps need to be digitally signed: Step 1. The MA receives misbehavior reports, including a reported pseudonym certificate with linkage value $lv=plv_1 \oplus plv_2$. Step 2. The MA runs global detection algorithms to determine which reported pseudonym certificates are of interest, i.e. whose linkage seeds and the corresponding enrollment certificates need to be determined. Step 3. The MA makes a request (signed) to the PCA to map the linkage values of the identified pseudonym certificate, lv, to the corresponding pre-linkage values ($plv_1$, $plv_2$) and the hash value of the RA-to-PCA pseudonym certificate request, all from the PCA's database. The PCA returns these values to the MA. Step 4.a. The IBLM (internal blacklist manager) of the MA sends the hash value of the RA-to-PCA pseudonym certificate request (signed) to the RA so that it can add the corresponding enrollment certificate to its internal blacklist. The RA does not return a value, i.e., does not give the enrollment certificate to anyone. Steps 4.b., 4.c. The MA makes a request to the $LA_1$ (resp., the $LA_2$) to map $plv_1$ (resp., $plv_2$) to the linkage seed $ls_1(i)$ (resp., $ls_2(i)$, where i is the currently valid time period. Both the LAs return the linkage seed to the MA. Note that given a linkage seed $ls_1(i)$, only the forward linkage seeds (i.e. $ls_1(j)$ for $j \geq i$) can be calculated, and thus backward privacy of the revoked vehicle is maintained. Step 5. The linkage seeds $ls_1(i)$ and $ls_2(i)$ and the time period i are added to the CRL. When the next CRL is due, the CRLG signs the CRL and publishes it. Further details are described in Whyte et al., supra.

There are a number of limitations and disadvantages to existing SCMS misbehavior identification and certification revocation procedures, including, but not limited to, the following: possibly compromised anonymity of misbehavior suspects prior to determination of revocability; a complex iterative process of misbehavior evidence collection; a complex process of determination of the identification of the vehicles whose credentials are to be revoked (due, in part, to the difficulty of determining the linkage seed or seed pair of a particular linkage value), and susceptibility to attack by an SCMS insider. The present invention is intended, inter alia, to address and solve these and other shortcomings of prior art approaches.

SUMMARY OF THE INVENTION

The present invention provides improvements in efficiency, security, and privacy in a security credential management system, including novel techniques for efficiently identifying misbehaving vehicles and revoking their credentials, while maintaining security and privacy.

A form of the invention is applicable for use in conjunction with a security credential management system that produces and manages pseudonym digital certificates issued to vehicles and used by vehicles to establish trust in vehicle-to-vehicle communications, said security credential management system including a pseudonym certificate authority processor entity which issues pseudonym digital certificates to vehicles, a registration authority processor entity that validates, processes and forwards requests for pseudonym digital certificates to the pseudonym certificate authority processor entity, and a misbehavior authority processor entity that receives misbehavior reports from reporter vehicles that include information about the reporter vehicles and suspect misbehaving vehicles and is responsible for producing a list of revoked credentials; said pseudonym certificate processor entity and registration authority processor entity participating in producing linkage values to be contained within the issued pseudonym digital certificates, said linkage values being derived ultimately, using a one-way function, from linkage seeds thereby enabling, in predetermined circumstances, at least some of the certificates containing linkage values derived from a given linkage seed to be revoked. A method is set forth for improving operation of said security credential management system, including the following steps: in conjunction with deriving said linkage values from said linkage seeds, additionally producing encrypted linkage maps that relate, in encrypted form, linkage values with linkage seeds from which they are derived; determining particular linkage values deemed to be of interest based at least in part on information derived from misbehavior reports; and determining linkage seeds associated with said particular linkage values utilizing decryptions of said encrypted linkage maps.

In an embodiment of this form of the invention the determined linkage seeds are utilized in a misbehavior identification process, and the misbehavior identification process is operative to determine if the misbehavior authority processor entity's revocation criteria has been satisfied and to identify which of the determined linkage seeds should be subject to revocation and published on a revocation list. Also in this embodiment, said step of producing encrypted linkage maps includes encrypting the linkage maps with an encryption key that is derived from a pseudonym certificate authority processor entity encryption key $K_{PCA}$ and a registration authority processor entity encryption key $K_{RA}$. Also in this embodiment, said steps of deriving linkage values from linkage seeds and producing encrypted linkage maps comprise implementing a secure two-party computation protocol between said pseudonym certificate authority processor entity and said registration authority processor entity, which includes providing private inputs that include said key $K_{PCA}$ from said pseudonym certificate authority processor entity and said key $K_{RA}$ from said registration authority processor entity. The private inputs of said pseudonym certificate processor entity further include a linkage seed input and the private inputs of the registration authority processor entity further include a vehicle identifier and at least one index relating to a time period for a linkage value. In another embodiment of this form of the invention, said step of utilizing the determined linkage seeds in a misbehavior identification process is implemented by performing a secure three-party computation protocol between the pseudonym certificate authority processor entity, the registration authority processor entity, and the misbehavior authority processor entity.

Another form of the invention is applicable for use in conjunction with a security credential management system that produces and manages pseudonym digital certificates issued to vehicles and used by vehicles to establish trust in vehicle-to-vehicle communications, said security credential management system including a pseudonym certificate authority processor entity which issues pseudonym digital certificates to vehicles, a registration authority processor entity that validates, processes and forwards requests for pseudonym digital certificates to the pseudonym certificate authority processor entity, and a misbehavior authority processor entity that receives misbehavior reports from reporter vehicles that include information about the reporter vehicles and suspect misbehaving vehicles and is responsible for producing a list of revoked credentials; said pseudonym certificate processor entity and registration authority processor entity participating in producing linkage values to be contained within the issued pseudonym digital certificates, said linkage values being derived ultimately, using a one-way function, from linkage seeds thereby enabling, in predetermined circumstances, at least some of the certificates containing linkage values derived from a given linkage seed to be revoked. A method is set forth for improving operation of said security credential management system, comprising: performing a misbehavior identification process by implementing a secure three-party computation protocol between the pseudonym certificate authority processor entity, the registration authority processor entity, and the misbehavior authority processor entity, said protocol being operative to determine, using misbehavior reports received at the misbehavior authority processor entity and inputs regarding the relationships between linkage values and the linkage seeds from which they are derived, to determine linkage seeds of suspect misbehaving vehicles and to apply revocation criteria to determine the linkage seeds of vehicles whose credentials are to be revoked.

An embodiment of this form of the invention further comprises publishing, on a revocation list, said determined linkage seeds of vehicles whose credentials are to be revoked. In the recited protocol, private inputs of said misbehavior authority processor entity include a database of suspect vehicle linkage values and reporter vehicle linkage values. In this embodiment, in conjunction with deriving said linkage values from said linkage seeds, additionally produced are encrypted linkage maps that relate, in encrypted form, linkage values with linkage seeds from which they are derived, and the linkage maps are encrypted with an encryption key that is derived from a pseudonym certificate authority processor entity encryption key $K_{PCA}$ and a registration authority processor entity encryption key $K_{RA}$, and also, in said protocol, a private input of said pseudonym certificate authority processor entity is said encryption key $K_{PCA}$, a private input of said registration authority processor entity is said encryption key $K_{RA}$, and a further private input of said misbehavior authority processor entity is the encrypted linkage maps for the suspect vehicle linkage values and reporter vehicle linkage values. Also in said protocol, a private output of the misbehavior authority processor entity is the linkage seeds of the vehicles that satisfy the revocation criteria, and a private output of the registration authority processor entity is the vehicle identifiers of vehicles that satisfy the revocation criteria.

Further features and advantages of the invention will become more readily apparent from the following detailed description when taken in conjunction with the accompanying drawings.

DETAILED DESCRIPTION

Figure 1:
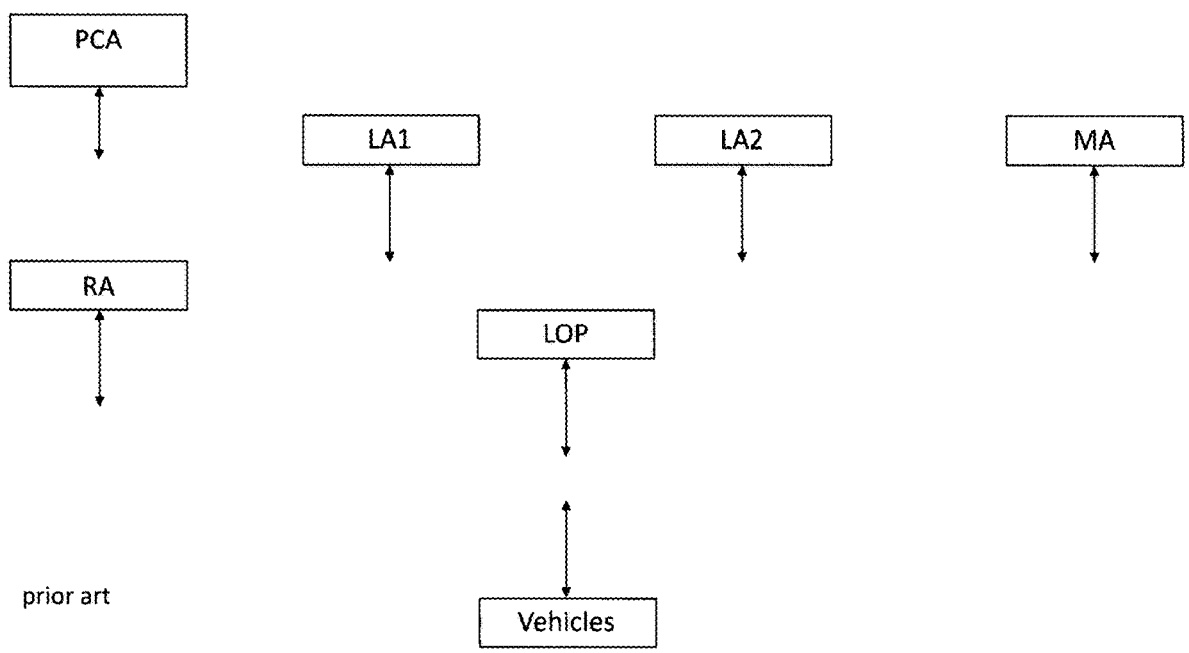
FIG. 1 is a simplified block diagram of a prior art security credential management system (SCMS) for vehicle-to-vehicle communication.
Figure 3:
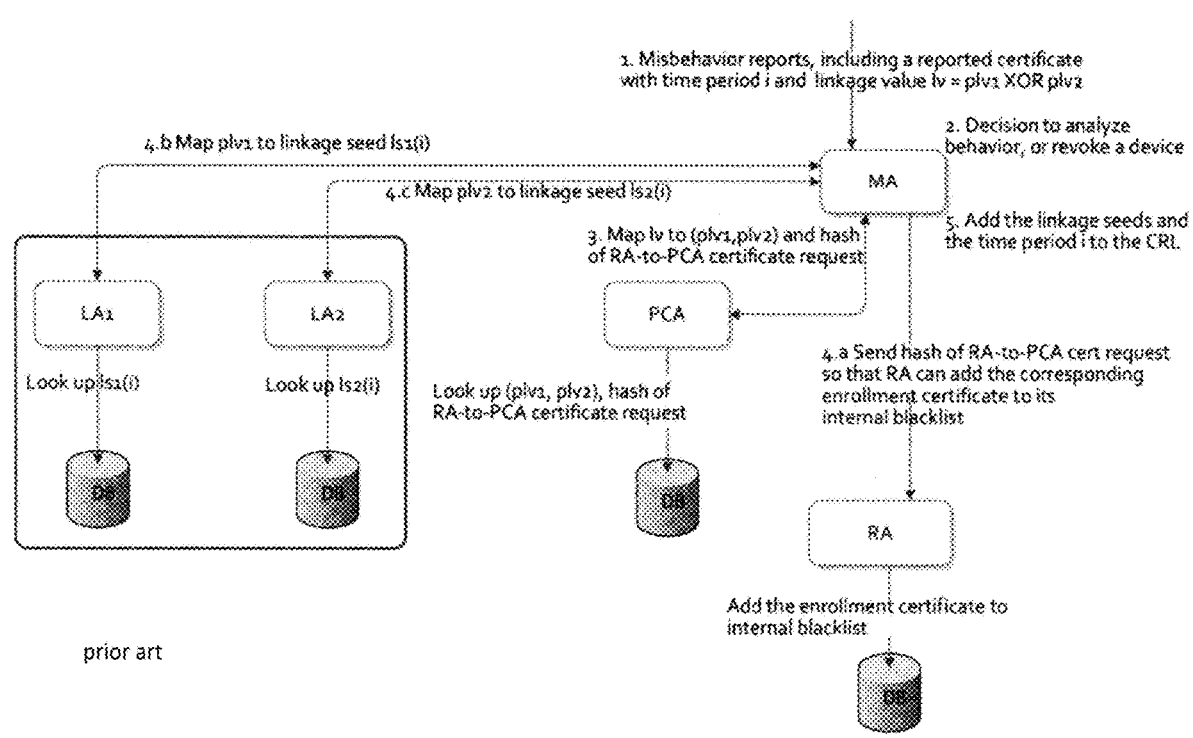
FIG. 3 is a diagram illustrating operation of the misbehavior authority (MA) of the SCMS and the revocation process of the SCMS.

FIG. 1 is a simplified diagram of portions of the Security Credential Management System (SCMS) as disclosed in Whyte et al., 2013, supra, incorporated herein by reference. (An updated version of the SCMS is disclosed in Benedikt Brecht, Dean Therriault, Andre Weimerskirch, William Whyte, Virendra Kumar, Thorsten Hehn, and Roy Goudy, "A Security Credential Management System for V2X Communications." In IEEE Transactions on Intelligent Transportation Systems, pp. 1022, 2018, which maintains, for the most part, the general nature of the SCMS described in the 2013 document.) FIG. 3, referenced subsequently, is a diagram illustrating the SCMS operation, as set forth in Whyte et al., supra, relating to the Misbehavior Authority (MA) and the process of identifying linkage seeds and enrollment certificates of misbehaving vehicles and revoking certificates thereof. Reference can be made to the published documents for a thorough understanding of the SCMS.

In FIG. 1, the Pseudonym Certificate Authority (PCA) issues pseudonym certificates to devices (especially, vehicles). The Registration Authority (RA) validates, processes, and forwards requests for pseudonym certificates to the Pseudonym Certificate Authority. The Misbehavior Authority (MA) processes misbehavior reports to identify potential misbehavior by devices and, if necessary, revokes and adds devices to a Certificate Revocation List (not shown). It also initiates the process of linking a certificate identifier to the corresponding enrollment certificate, and adding the enrollment certificate to an internal blacklist. The Linkage Authority (LA) generates linkage values which are used in the certificates and support efficient revocation. There are two LAs in the SCMS, referred to as LA1 and LA2. The splitting prevents the operator of an LA from linking certificates belonging to a particular device. The location Obscurer Proxy (LOP) hides the location of the requesting device by changing source addresses, and thus prevents linking of network addresses to locations. Additionally, when forwarding information to the Misbehavior Authority (MA), the LOP shuffles the reports to prevent the MA from determining the routes of vehicles reporting misbehavior.

In the simplified diagram of FIG. 1, the functions of the illustrated authorities are intended to be consistent with the descriptions thereof in the Whyte et al. 2013 publication, supra, and do not share certain private data and cryptographic materials unless otherwise indicated. The authorities are indicated herein as having their functions implemented, at least in part, by separate processor entities, with proper separation of logical roles.

Figure 2:
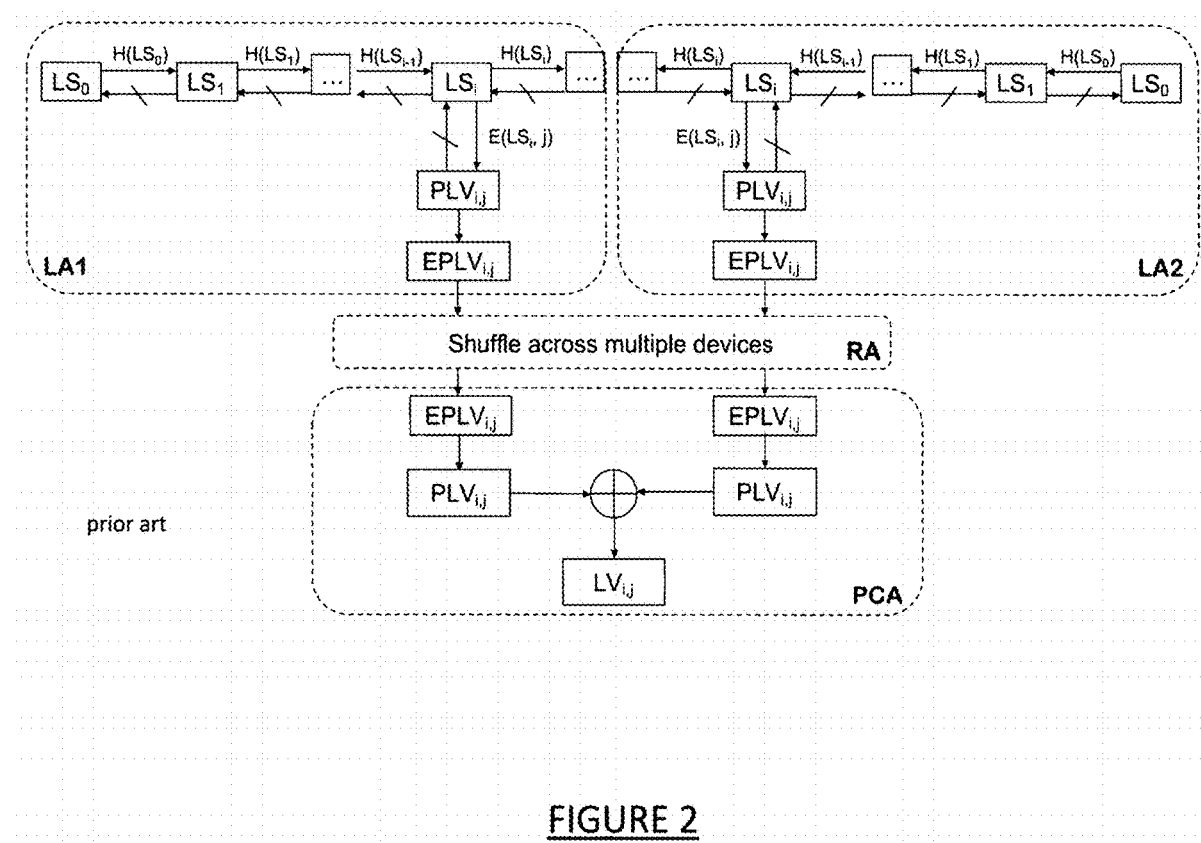
FIG. 2 is a diagram that illustrates the process used in a current security credential management system (SCMS) for generating linkage values from linkage seeds.

FIG. 2 is a diagram that illustrates the process used in the current Security Credentials Management System (SCMS) for generating linkage values from linkage seeds, utilizing at least four of the previously summarized authority processor entities of the SCMS; namely the two linkage authorities LA1 and LA2, the Registration Authority RA, and the Pseudonym Certificate Authority PCA. (These abbreviations are shown in bold in the dashed-line blocks in the Figure, which illustrate operational performance of the blocks relating to the described process.) Each of the linkage authorities LA1 and LA2 independently generates a random number as a linkage seed (that is, a 128 bit random number designated $LS_0$ in the diagram). As described in the Whyte et al. 2013 document, supra, the linkage seed is subjected to a chain of hash operations (each represented by H in the diagram), the number of hashes in the chain being determined by an index i, where i is the number of the particular week for which the linkage values are being computed. As seen in the diagram, the forward progressing arrows do not have a diagonal slash line, but the backward-directed arrows have a diagonal slash line. This denotes that the processing is not reversible (the hash function being a one-way function). Accordingly, after i successive hashes, the result is LS; that is, the linkage seed hashed i times. Next, $LS_i$ and j undergo an encryption process, using j as the subject of the encryption and $LS_i$ as the encryption key, where the index j designates the particular linkage value during the $i_{th}$ week, where j is between 1 and 20. The resultant pre-linkage values are designated $PLV_{ij}$. As described in Whyte et al., 2013, supra, the pre-linkage values are encrypted (to hide these values from the registration authority processor entity) as $EPLV_{ij}$ and shuffled across multiple vehicles by the registration authority processor entity (to avoid revealing and associating a sequence of linkage values for a particular vehicle) and then decrypted at the pseudonym certificate authority processor to recover the pre-linkage values $PLV_{ij}$. The two pre-linkage values are then exclusive-ORed to obtain the linkage value $LV_{ij}$ and this prevents either of the linkage authorities (LA1 or LA2) from being able to learn the ultimately derived linkage value.

In the existing SCMS, the private inputs of each LA1 and LA2 are the entire database of initial linkage seed values, consisting of one entry per vehicle (e.g., for 300 million vehicles). The PCA has no private inputs and the RA's private inputs are the vehicle identifier (denoted EE), i, and j, where, for the SCMS, i equals 52 weeks (for one year, or 52×30 for a possible 30 year car life, according to SCMS) and j equals 20 linkage values per week, all of which computes to potentially about 9 trillion linkage values for 300 million vehicles over a 30 year period. For a fifteen year vehicle life, the number would be approximately 4.5 trillion linkage values.

Among the limitations of the existing SCMS is that the inputs of the linkage authorities LA1 and LA2 are extremely large (e.g. hundreds of millions of entries). In copending U.S. patent application Ser. No. 15/999,936, filed Aug. 31, 2018 and assigned to the same assignee as the present Application, multiparty computation protocols are employed to advantage in producing linkage values. The complexity of multiparty computation protocols grows quickly with the number of parties, which would be the four relevant organizations (LS1, LS2, RA, and PCA) in the current SCMS design. In embodiments of said copending '936 Application, functionalities of LA1 and LA2 are effectively "merged" with PCA, so a much less complex two party secure computation protocol (using a garbled circuit technique) can be employed. Also, the initial linkage seed is computed on the fly inside secure computation using a hash function and inputs from PCA and RA, so one of the party's inputs become relatively small. Including the described modifications, the secure computation protocol of the copending '936 Application also discloses the following features: There are only two parties involved in the computation; namely the PCA and the RA. The linkage value functionality is modified such that instead of taking the initial linkage seed-pair as input, it takes $K_{LS}$, an initial linkage seed generation key held by the PCA, and EE (vehicle identifier) as inputs to generate the initial linkage seed-pair inside the functionality itself. The private input of the PCA is $K_{LS}$, and the private inputs of the RA are EE, i, and j. The private output of the PCA is the linkage value; lv(EE, i, j) (that is, linkage values as a function of EE, i, and j, and the private output of RA is the address for lv(EE, i, j) (that is, a pointer to that address).

FIG. 3 is a diagram from the SCMS description of Whyte et al., supra, illustrating operation of the Misbehavior Authority (MA) of the SCMS and the revocation process of the SCMS. The Authorities labeled as LA1, LA2, RA, PCA, and MA correspond to their counterparts in the simplified diagram of FIG. 1. The cylinders shown as being respectively coupled with the Authorities LA1, LA2, RA, and PCA, and all labeled as DB, are databases associated with the respective Authorities. As previously indicated, the Authorities have their functions implemented, at least in part, by separate processor entities, with proper separation of logical roles.

The FIG. 3 illustration includes text that summarizes operation of the MA in conjunction with the other Authorities in implementing revocation, including: (1) receipt of misbehavior reports, each including a reported certificate with time period and linkage value lv which equals prelinkage value plv1 exclusive ORed with prelinkage value plv2; (2) the decision made to analyze behavior or revoke the credentials of a device (e.g. vehicle); (3) in conjunction with PCA, map lv to (plv1, plv2) and hash of RA-to-PCA certificate request; (4a) send hash of RA-to-PCA certificate request so that the RA can add the corresponding enrollment certificate to this internal blacklist (see also link from RA to its associated database); (4b and 4c) in conjunction with Linkage Authorities LA1 and LA2, map plv1 and plv2 to their respective linkage seeds for time period i, that is, linkage seed ls1(i) (obtained from a reverse table look-up using the data base of LA1), and ls2(i) (obtained from a reverse table look-up using the data base of LA2); (5) add the linkage seed (that is, the linkage seed pair) to the Certificate Revocation List (CLR).

The misbehavior detection system of SCMS is complex and not all details of the system are relevant for understanding the improvements of embodiments of the invention. The following simplifying assumptions are made to facilitate understanding of an illustrative example: Vehicles are assumed to submit misbehavior reports to the Misbehavior Authority (MA), one per misbehavior incidence, and every report includes one suspect linkage value (SLV) and one reporter linkage value (RLV). The revocation policy of the MA for this example is a simple threshold based one; namely, there are two thresholds, suspect threshold and reporter threshold, and a vehicle is deemed revocable if a suspect vehicle was reported at least a suspect threshold number of times by at least a reporter threshold number of unique vehicles.

The misbehavior detection process, from the moment misbehavior reports are received by the MA to the revocation of misbehaving vehicles via publication on the Certificate Revocation List (CRL), can be divided into the following main steps: (1) Misbehavior report validation, where reports are checked for correctness and simple physical plausibility, such as whether the reported vehicles speeds are within reasonable ranges. (2) Misbehavior analysis, where reports are run through algorithms to create groups of reports (e.g. from particular geographical regions) that warrant investigation together. (3) Misbehavior investigation, where the MA sends a list of (suspect linkage value, reporter linkage value) tuples to the PCA, which responds with the corresponding list of (suspect pre-linkage values, reporter pre-linkage values) and then the MA sends the list received, from the PCA to one of the LAs, to learn a list of suspect pre-linkage values that satisfy the revocation policy. (4) Revocation, where the MA sends a list of suspect linkage values that need to be revoked to the PCA, which responds with the corresponding list of pre-linkage value-pairs, and then the MA sends the list of pre-linkage values, one from each pair to the LA1 and the other from each pair to the LA2, to learn the corresponding list of linkage seeds-pairs that will be added to the CRL.

An embodiment of the invention involves improvements of steps (3) and (4), i.e., misbehavior investigation and revocation. In such embodiment, these steps are combined effectively into one operation using a secure Multi-Party Computation (MPC) based approach, where MA's inputs comprise a list of (suspect linkage value, reporter linkage value) tuples and at the end of the MPC protocol, it receives a list of linkage seed-pairs for vehicles that satisfy the revocation policy.

In the following illustrative example (in which "slv" denotes a suspect linkage value and "rlv" denotes a reporter linkage value) the suspect and reporter thresholds are assumed to be 3 and 2, respectively.

MA's input
   slv-23, rlv-611;
   slv-23, rlv-623;

slv-23, rlv-723;
slv-51, rlv-223;
slv-51, rlv-483;
slv-53, rlv-592;
slv-73, rlv-223;
slv-86, rlv-223;
slv-99, rlv-483;

MA's output
Linkage seed pair corresponding to slv-51;
Linkage seed pair corresponding to slv-73;

The following exemplary mappings are not available to any authority at any point, but are presented here for the purpose of understanding the example.

Suspect vehicles' linkage values
Suspect 1: slv-23;
Suspect 2: slv-51, slv-53;
Suspect 3: slv-73, slv-86, slv-99;

Reporter vehicles' linkage values
Reporter 1: rlv-611, rlv-623, rlv-723;
Reporter 2: rlv-223;
Reporter 3: rlv-483, rlv-592;

In the above example, even though slv-23 is reported three times by three reporter linkage values (rlv-611, rlv-623, rlv-723), since they all belong to the same reporter vehicle ("Reporter 1"), this doesn't satisfy the revocation policy, and hence the linkage seed pair corresponding to slv-23 is not in the MA's output. On the other hand, since slv-51, slv-53 belong to Suspect 2 and slv-73, slv-86, slv-99 belong to "Suspect 3", both of them satisfy the revocation policy, and hence their linkage seed pairs are present in the MA's output.

There are several approaches to multiparty computation (MPC), primarily due to the multiple parameter options that need to be considered in the design of MPC protocols, such as: the number of parties involved; the number (especially if a majority or minority) of parties that are assumed to behave honestly; whether the corrupt parties are just semi-honest (i.e., follow the protocol correctly but try to learn as much information as possible from the protocol transcript) or malicious; whether the corruption is static (i.e., parties to be corrupted are decided in advance of the protocol execution) or dynamic; whether the communications among parties are synchronous or asynchronous; and whether the communications among parties are authenticated and/or private, etc. It will be understood that different choices of the above options can lead to differences in particular protocols, so unless noted otherwise, protocols set forth are intended to include the possibility of variation for these types of options.

As employed in some of the illustrative examples hereof, the steps of multi-party computation comprise the following:
1. Determine the number of parties and other relevant parameter choices.
2. Determine the inputs and outputs of all the parties.
3. Determine the function to be computed and convert it into a Boolean circuit. For example, in an embodiment hereof, a function to be computed depends on the misbehavior detection policies and parameters of the Misbehavior Authority (MA) of the SCMS.
4. Determine an MPC protocol satisfying the above, and have the parties execute it.

In an illustrative embodiment hereof, misbehavior identification process of the existing SCMS using secure multiparty computation can be implemented as follows.
1. There are 4 parties involved in the computation, namely the Linkage Authorities LA1 and LA2, the Misbehavior Authority (MA), and the Registration Authority (RA).
2. The private inputs of the different parties are:
  a. LA1: entire database of linkage seeds for the current i period comprising 1 entry per vehicle;
  b. LA2: entire database of linkage seeds for the current i period comprising 1 entry per vehicle;
  c. MA: entire database of suspect and reporter linkage values;
  d. RA: entire database of vehicle IDs.
3. The private outputs of the different parties are:
  a. LA1, LA2: nothing;
  b. MA: linkage seed pairs of all the vehicles that satisfy revocation criteria;
  c. RA: vehicle IDs of all the vehicles that satisfy revocation criteria.
4. The function to be computed:
  a. Take the inputs of the LA1, the LA2 and the RA, and compute all the possible linkage values for the current i period;
  b. Compare these linkage values with the inputs of the MA;
  c. For all the vehicles that satisfy revocation criteria, return the outputs to the MA and the RA as specified above.

The main challenge in designing an efficient secure computation protocol for Misbehavior Identification (MID) is dealing with the large inputs of the authorities. MA's input could potentially consist of millions of linkage values depending on the amount of misbehavior and its reporting, but it is still relatively small compared to the input of RA (and the two LAs), which will consist of 300 million vehicle IDs (and 300 million linkage seeds from each of the LAs), that need to be used to compute 20×300 million linkage values (e.g. the number of linkage values produced for use during a week) on the fly inside the secure computation protocol for the given i period. The reason for such large inputs of RA and the LAs is the inherently one-way design of linkage value functionality (see e.g., description in conjunction with FIG. 2), i.e., given a linkage value there is no way to go a few steps back and obtain the linkage seed. Due to this one-way design, in the current SCMS implementation, PCA and LA need to do reverse lookups in their databases consisting of hundreds of millions of entries. For a secure computation protocol based misbehavior identification, that reverse lookup needs to happen inside the secure computation and so the RA and the LAs need to provide their entire databases as their private inputs. Thus, the two main limitations of the foregoing approach are the complexity of secure multiparty computation protocols which grows with the number of parties (four, in the approach of this example), and the size of the inputs of the LA1, the LA2, and the RA are extremely large.

These limitations are addressed in an embodiment hereof as follows: Functionalities of the LA1 and the LA2 are replaced with the PCA using a feature hereof called Encrypted Linkage Map, so the four-party MPC becomes a three-party protocol among the MA, the PCA and the RA. Also, instead of computing all the possible linkage values inside the MPC protocol, only the suspect and reporter Encrypted Linkage Maps are decrypted inside the MPC protocol, so parties' inputs and the Boolean circuit become relatively small.

The Encrypted Linkage Map, denoted elm(EE, i, j) for a given vehicle ID (denoted EE), period i, and index j, is defined as the encryption of Linkage Map, denoted lm(EE, i, j):

$$elm(EE,i,j)=Enc(K,lm(EE,i,j)), \text{ where}$$

1. Encryption key K is derived from the following:
   a. PCA's key: $K_{PCA}$;
   b. RA's key: $K_{RA}$;
2. Linkage map lm(EE, i, j) comprises the following:
   a. Linkage value: lv(EE, i, j);
   b. Linkage seed pair corresponding to lv(EE, i, j): ls1(EE, i), ls2(EE, i);
   c. Vehicle ID corresponding to lv(EE, i, j): EE;
3. The encryption key K for the Encrypted Linkage Map can be any suitable function of $K_{PCA}$ and $K_{RA}$, some examples of the key derivation function being:
   a. Exclusive OR: $K=K_{PCA} \oplus K_{RA}$;
   b. Concatenation: $K=K_{PCA} \| K_{RA}$;
   c. Cryptographic hash-based: $K=\text{Hash}(K_{PCA}, K_{RA})$;
   d. Symmetric encryption-based: $K=\text{Enc}(K_{PCA}, K_{RA})$;

[It is implied, for purposes hereof, that the indicated operations for generation of K can, where appropriate, be performed in the reverse order of that shown.] Encrypted Linkage Map is computed along with and during the computation of linkage values, and require the use of secure computation since both the encryption key and linkage map are distributed among more than one semi-autonomous authorities: the LA-pair, the PCA, and the RA.

In the above-referenced copending U.S. patent application Ser. No. 15/999,936, assigned to the same assignee as the present Application, there are disclosed a number of embodiments for improved techniques for securely and efficiently generating linkage values for SCMS. The techniques hereof are adaptable for functioning in conjunction with any of the embodiments thereof. The following embodiment involves utilizing the encrypted linkage maps (e.g., for efficient determination of the linkage seed corresponding to each suspect and reporter linkage values, using MPC) in the context of a credential management system, as disclosed in the '936 Application, that generates linkage values from linkage seeds produced "on the fly" using a linkage seed key $K_{LS}$ and a two-party MPC protocol between the RA and the PCA of SCMS, without the need for the linkage authorities (LA1 and LA2). In this protocol:

The private inputs of the different parties are
   PCA: $K_{LS}$, $K_{PCA}$;
   RA: EE, i, j, $K_{RA}$;

The private outputs of the different parties are
   PCA: lv(EE, i, j), elm(EE, i, j);
   RA: address for lv(EE, i, j);

Outputs of the PCA can be either stored in a public database, or sent directly to the MA for later use in misbehavior identification.

With the introduction of encrypted linkage maps, the MPC-based misbehavior identification protocol is as follows.

1. There are 3 parties involved in the secure multi-party computation, namely the Misbehavior Authority (MA), the Pseudonym Certificate Authority (PCA), and the Registration Authority (RA).
2. Prior to the MPC protocol, the MA obtains encrypted linkage maps of all the suspect and reporter linkage values.
3. The private inputs of the different parties are:
   a. MA: the entire database of suspect linkage values and the corresponding encrypted linkage maps, and reporter linkage values and the corresponding encrypted linkage maps;
   b. PCA: Key $K_{PCA}$;
   c. RA: Key $K_{RA}$;
4. The private outputs of the different parties are
   a. MA: linkage seed pairs of all the vehicles that satisfy revocation criteria;
   b. RA: vehicle IDs of all the vehicles that satisfy revocation criteria;
5. The function to be computed
   a. Decrypt all the encrypted linkage maps using $K_{PCA}$ and $K_{RA}$, and compare the linkage value obtained from decryption with the corresponding linkage value from the MA's input. If any of the linkage values obtained from decryption differs from the corresponding linkage value from the MA's input, then abort, otherwise go to the next step. (Differing linkage values imply that those encrypted linkage maps are incorrect, and therefore the protocol must be aborted.)
   b. Check for the revocation criteria using the linkage seeds obtained from the decryption of encrypted linkage maps. For all the vehicles that satisfy the revocation criteria, return the outputs to the MA and the RA as specified above.

Figure 4A:
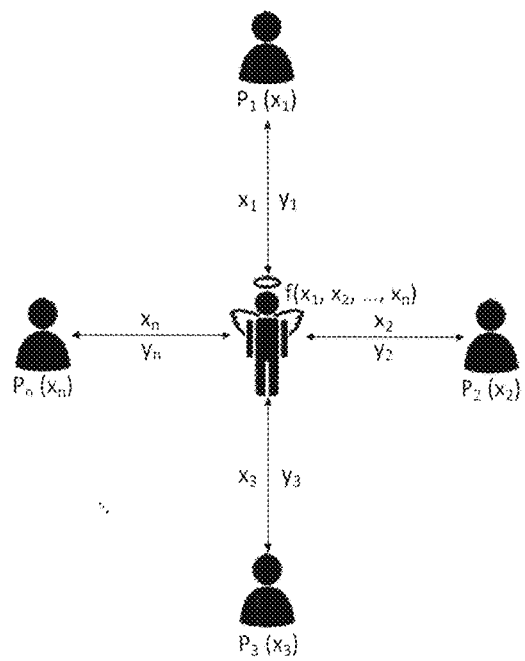
FIGS. 4A and 4B illustrate prior art multiparty computation approaches with a trusted party (FIG. 4A) and without a trusted party (FIG. 4B).
Figure 4B:
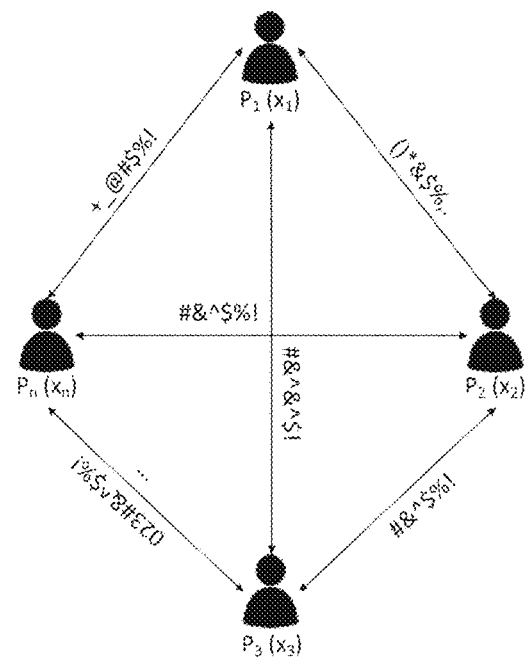

Secure multi party computation (MPC) is a significant area of research within cryptography and information security, that aims to solve the following problem: n parties $P_1$, $P_2, \ldots, P_n$, each holding private inputs $x_1, x_2, \ldots, x_n$, respectively, wish to jointly compute a function $f(x_1, x_2, \ldots, x_n) = y_1, y_2, \ldots, y_n$, such that each party ($P_i$) learns its respective output ($y_i$) and nothing else (including anyone else's private inputs). A standard example is the so-called "millionaires' problem", where a number of millionaires want to know who is the richest among them without revealing their individual wealth. This problem, and MPC in general, can be trivially solved if there exists a party that everyone trusts, as illustrated in FIG. 4A. Each party provides its input securely to the trusted party (shown centrally, with angel wings and a halo), who on receiving all the inputs performs the computation, and sends the correct output to each party securely. MPC protocols are designed to solve this problem without the need for any such trusted party, for any number of parties, and for any computable function. This is illustrated generally in FIG. 4B, wherein communication links are illustrated as being present between each party and every other party. At least some of the communications involve encryption and oblivious transfer, which are fundamental to MPC protocols. Accordingly, in the simplified illustration of FIG. 4B, the character strings shown on the links appear random, since they are usually ciphertexts unintelligible to anyone other than the communicating parties. There are a large variety of MPC protocols. Yao gave the first protocol for secure two-party computation, popularly known as Yao's Garbled Circuits (see e.g., Andrew Chi-Chih Yao: "Protocols for Secure Computations (Extended Abstract)". FOCS 1982: 160-164). The result was extended to more than two parties by Goldreich, Micali and Wigderson (referred to as "GMW", see Oded Goldreich, Silvio Micali, Avi Wigderson: "How to Play any Mental Game or A Completeness Theorem for Protocols with Honest Majority", STOC 1987: 218-229). Currently, there are both Yao- and GMW-based protocols known for any number of parties, and these two types of protocols differ primarily in the amount of computation and communication (and the number of communication rounds) required. For both Yao and GMW-based protocols, protocol complexity depends on the number of parties involved, and it usually grows quadratically as opposed to linearly; for example, an eight-party protocol is likely to be 16 times (as opposed to 4 times) more inefficient than a two-party protocol. Reference can also be made to more recent results, such as "Authenticated Garbling and Efficient Maliciously Secure Two-Party Computation", ACM Conference on Computer and Communications Security 2017: 21-37; and "Fast Secure Two-Party ECDSA Signing", CRYPTO (2) 2017: 613-644.

Figure 5:
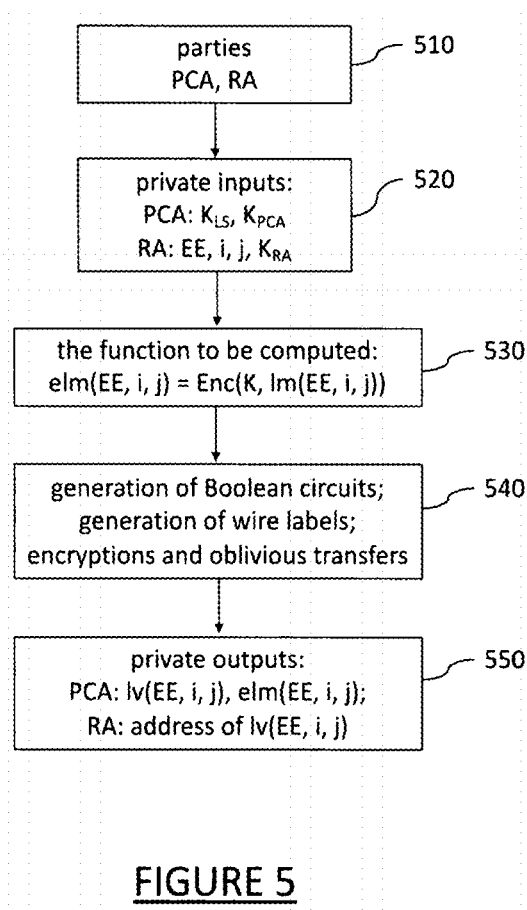
FIG. 5 is a flow diagram of a routine for implementing a secure two-party computation protocol for deriving linkage values from linkage seeds and producing encrypted linkage maps in accordance with an embodiment of the invention.

Referring to FIG. 5, there is shown a flow diagram of a routine for controlling processor entities of the system to implement the secure MPC protocol described above for generating encrypted linkage value maps, in conjunction with the linkage value generation. Reference can also be made to the above referenced copending U.S. patent application Ser. No. 15/999,936 which describes in detail a two-party secure MPC protocol between the PCA and the RA processor entities (without the need for the linkage authorities LA1 and LA2) for generation of linkage values from linkage seeds. As described therein, a garbled circuit protocol is utilized, and can also be utilized for this embodiment of the present invention. (Regarding garbled circuits, reference can be made, for example, to Andrew Chi-Chih Yao: "Protocols for Secure Computations (Extended Abstract)". FOCS 1982: 160-164; and Yehuda Lindell and Benny Pinkas, "A Proof of Security of Yao's Protocol for Two-Party Computation", J. Cryptology, 22(2):161-188, 2009; and Michael O. Rabin, "How to Exchange Secrets by Oblivious Transfer", Tech. Memo TR-81, Aiken Computation Laboratory, Harvard U., 1981.) A determination is made, as represented by block 510, as to the parties, in this case the PCA processor entity and the RA processor entity, and their roles for generator or evaluator for garbled circuit processing. The inputs of the parties are implemented (block 520); namely, for the PCA the private inputs are the encryption keys $K_{LS}$ and $K_{PCA}$, and for the RA the private inputs are the vehicle identifier EE, the indices i and j, and the encryption key $K_{RA}$. The function to be computed is determined and input (block 530) which, as noted above, for the encrypted linkage maps, is $$elm(EE,i,j)=Enc(K,lm(EE,i,j))$$

where the key K is derived from $K_{PCA}$ and $K_{RA}$. Then, as represented by the block 540, the garbled circuit procedure is implemented, including generation of the Boolean circuit representative of the function, generation of the wire labels of the circuit, and the encryption and oblivious transfers, all in accordance with principles known in the art. The private outputs of the parties are thereby obtained (block 550) by the respective parties; that is, for the PCA, the linkage values lv(EE, i, j) and associated encrypted linkage maps elm(EE, i, j), and, for the RA, the addresses for linkage values lv(EE, i, j).

Figure 6:
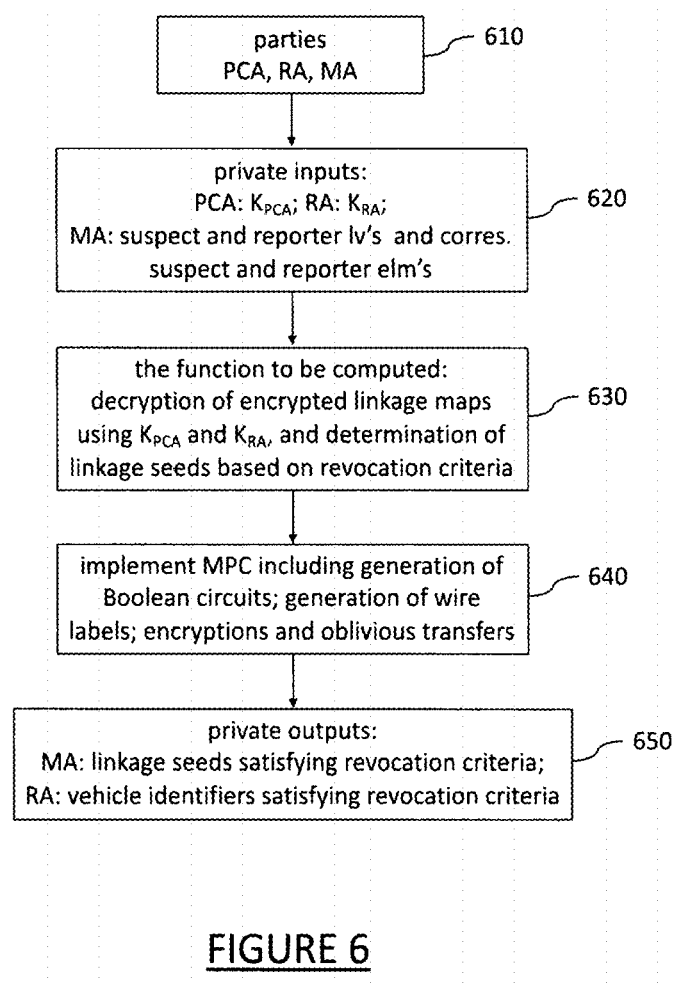
FIG. 6 is a flow diagram of a routine for implementing a secure three-party computation protocol for achieving misbehavior identification in accordance with an embodiment of the invention.

Referring to FIG. 6, there is shown a flow diagram of a routine for controlling processor entities of the system to implement the secure MPC protocol described in an embodiment set forth above for misbehavior identification. This embodiment involves a secure 3-party MPC, and reference can be made for example to the above citations of documents that disclose protocols for secure multiparty computation techniques that are known in the art. In FIG. 6, a determination is initially made, as represented by block 610, as to the participating parties, in this case the PCA processor entity, the RA processor entity, and the MA processor entity, and the inputs of the parties (block 620). For the PCA the private input is the encryption key $K_{PCA}$, for the RA the private input is the encryption key $K_{RA}$, and for the MA, the database of suspect and reporter linkage values and the corresponding suspect and reporter encrypted linkage maps. The function to be computed is determined and input (block 630). In this embodiment, as was described above, the function includes decryption of encrypted linkage maps using keys $K_{PCA}$ and $K_{RA}$, and employing the revocation criteria on the determined linkage seeds. This is performed using the encryptions/decryptions and oblivious transfers of the protocol (block 640), and the resultant private outputs (block 650) of the MA, which are the linkage seeds (or linkage seed pairs) of the vehicles that satisfy the revocation criteria, and of the RA, which are the vehicle identifiers of such vehicles.

The described embodiments are, for the most part, compatible with SCMS, at least to the extent that a transition from current SCMS design to them would be transparent to vehicles. However, as pointed out in the copending '936 Application, since privacy is guaranteed by secure computation, there is, in most embodiments, no longer a need for two separate linkage chains per vehicle. The use of single linkage seed values would provide further efficiencies. The function used for generating each linkage value and encrypted linkage map can be changed to utilize only one (instead of two) linkage chains per vehicle. Accordingly, in the present Application, it will be understood that recitation of a linkage seed can, where appropriate, imply a linkage seed pair, and vice versa.

The invention hereof is primarily applicable for use in a system, such as the SCMS, involving vehicle-to-vehicle communication, but it will be understood that such systems typically are general enough to involve communications between vehicles and devices which are not vehicles, and that such communications may also be implemented using digital certificates and linkage values as part of an overall scheme for efficiently maintaining privacy as well as security.

It will be understood that linkage values as described herein, can alternatively be described as linkage value signals, since the processors which produce them will typically, although not necessarily, be electronic processors that produce, store, transmit, and/or receive values as electronic digital bitstreams.

The invention claimed is:

1. A method for improving operation of a security credential management system used for vehicle-to-vehicle communication, the method comprising:

generating one or more linkage seeds based on a linkage seed generation key and a vehicle identifier, wherein each of the one or more linkage seeds corresponds to a random number generated at the security credential management system configured to issue pseudonym certificates;

determining, based on a one-way function, one or more linkage values from the one or more linkage seeds, wherein the one or more linkage values are included in a corresponding pseudonym digital certificate to be used in the vehicle-to-vehicle communication;

producing at least one encrypted linkage map that associates the one or more linkage values with the one or more linkage seeds and the vehicle identifier;

determining that at least one linkage value from the one or more linkage values is a linkage value of interest based at least in part on information derived from misbehavior reports generated by a misbehavior authority processor of the security credential management system, each misbehavior report of the misbehavior reports including a suspect linkage value associated with a suspect vehicle and a reporter linkage value associated with a reporting vehicle;

decrypting the at least one encrypted linkage map to identify at least one linkage seed from the one or more linkage seeds and the vehicle identifier that is associated with the linkage value of interest; and determining, based on the identified at least one linkage seed, whether a revocation criteria of the misbehavior authority processor is satisfied for a vehicle associated with the vehicle identifier based on a number of times the vehicle associated with the vehicle identifier has been reported as a suspect vehicle and a number of different reporting vehicles that have reported the vehicle; and in response to the determining that the revocation criteria of the misbehavior authority processor is satisfied, revoking the credentials of the vehicle associated with the at least one linkage seed by applying the revocation criteria.

2. The method of claim 1, wherein determining whether the revocation criteria of the misbehavior authority processor is satisfied for the vehicle comprises:

determining the revocation criteria of the misbehavior authority processor is satisfied for the vehicle based on a determination that the number of times the vehicle associated with the vehicle identifier has been reported as a suspect vehicle is greater than a threshold number of times and a determination that the number of different reporting vehicles that have reported the vehicle is greater than a threshold number of reporting vehicles.

3. The method of claim 2, further comprising determining, based on determining the revocation criteria is satisfied for the vehicle, that the at least one linkage seed is subject to revocation and publication on a revocation list.

4. The method of claim 1, wherein producing the at least one encrypted linkage map includes encrypting at least one linkage map with an encryption key that is derived from a pseudonym certificate authority processor encryption key (KPCA) and a registration authority processor encryption key (KRA).

5. The method of claim 4, wherein the derived encryption key is selected from at least one of:

a result of an exclusive OR operation of the KPCA with the KRA, a result of concatenation of the KPCA with the KRA, a hash of the KPCA and the KRA, and an encryption of the KPCA with the KRA as the encryption key.

6. The method of claim 4, wherein determining the one or more linkage values from the one or more linkage seeds and producing the at least one encrypted linkage map comprises:

implementing a secure two-party computation protocol between the pseudonym certificate authority processor and the registration authority processor, wherein the secure two-party computation protocol includes providing private inputs that include the KPCA from the pseudonym certificate authority processor and the KRA from the registration authority processor.

7. The method of claim 6, wherein the private inputs of the pseudonym certificate authority processor further include a linkage seed input and the private inputs of the registration authority processor further include the vehicle identifier and at least one index relating to a time period for a linkage value.

8. The method of claim 2, wherein utilizing the one or more linkage seeds in a misbehavior identification process includes performing a secure three-party computation protocol between a pseudonym certificate authority processor, a registration authority processor, and the misbehavior authority processor.

9. The method of claim 3, wherein utilizing the one or more linkage seeds in a misbehavior identification process includes performing a secure three-party computation protocol between a pseudonym certificate authority processor, a registration authority processor entity, the misbehavior authority processor.

10. The method of claim 1, wherein a first linkage authority processor and a second linkage authority processor operate in conjunction with a pseudonym certificate processor and a registration authority processor to produce the one or more linkage values, by independently producing the one or more linkage seeds from which the one or more linkage values are derived.

11. The method of claim 10, wherein deriving the one or more linkage values from the one or more linkage seeds and producing the at least one encrypted linkage map comprises implementing a secure four-party computation protocol between the first linkage authority processor, the second linkage authority processor, a pseudonym certificate authority processor, and the registration authority processor.

12. The method of claim 11, wherein implementing the secure four-party computation protocol includes providing private inputs that include a first key from the pseudonym certificate authority processor and a second key from the registration authority processor.

13. A method for improving operation of a security credential management system used for vehicle-to-vehicle communication, the method comprising:

performing a misbehavior identification process by implementing a secure three-party computation protocol between a pseudonym certificate authority processor, a registration authority processor, and a misbehavior authority processor configured to receive misbehavior reports;

determining, based on the secure three-party computation protocol, the misbehavior reports received at the misbehavior authority processor, and at least one encrypted linkage map that associates one or more linkage values with a vehicle identifier and with one or more linkage seeds from which the one or more linkage values are derived, at least one linkage seed of the one or more linkage seeds that are associated with at least one misbehaving vehicle, a linkage seed being a random number generated based on a linkage seed generation key and the vehicle identifier at the security credential management system configured to issue pseudonym digital certificates; and in response to the determining that the revocation criteria of the misbehavior authority processor is satisfied, revoking the credentials of the vehicle associated with the at least one linkage seed by applying the revocation criteria of a vehicle associated with the at least one linkage seed and the vehicle identifier based on a number of times the vehicle associated with the vehicle identifier has been reported as a suspect vehicle and a number of different reporting vehicles that have reported the vehicle.

14. The method of claim 13, further comprising:

publishing, on a revocation list, the at least one linkage seed associated with the at least one misbehaving vehicle.

15. The method of claim 13, wherein, in the secure three-party computation protocol, private inputs of the misbehavior authority processor include a database of suspect vehicle linkage values and reporter vehicle linkage values.

16. The method of claim 15, wherein the at least one encrypted linkage map is encrypted with an encryption key that is derived from a pseudonym certificate authority processor encryption key (KPCA) and a registration authority processor encryption key (KRA), and wherein, in the secure three-party computation protocol, a private input of the pseudonym certificate authority processor is the KPCA, a private input of the registration authority processor is the KRA, and a further private input of the misbehavior authority processor is the at least one encrypted linkage map for the suspect vehicle linkage values and the reporter vehicle linkage values.

17. The method of claim 16, wherein, in the secure three-party computation protocol, a private output of the misbehavior authority processor includes linkage seeds of vehicles that satisfy the revocation criteria, and a private output of the registration authority processor includes vehicle identifiers of the vehicles that satisfy the revocation criteria.

18. The method of claim 17, wherein, in the secure three-party computation protocol, a function is determined that includes (1) decryption of the KPCA, and the KRA, (2) application of the revocation criteria on the at least one linkage seed obtained from decryption of the at least one encrypted linkage map of the suspect vehicle linkage values and the reporter vehicle linkage values, (3) return of the linkage seeds of vehicles that satisfy the revocation criteria to the misbehavior authority processor, and (4) return of the vehicle identifiers of the vehicles that satisfy the revocation criteria to the misbehavior authority processor.

19. The method of claim 13, wherein applying the revocation criteria to revoke credentials of the vehicle comprises:
   determining the number of times the vehicle associated with the vehicle identifier has been reported as a suspect vehicle is greater than a threshold number of times;
   determining the number of different reporting vehicles that have reported the vehicle is greater than a threshold number of reporting vehicles; and
   revoking the credentials of the vehicle based on the number of times the vehicle has been reported as a suspect vehicle being greater than the threshold number of times and the number of different reporting vehicles that have reported the vehicle being greater than the threshold number of reporting vehicles.

20. An apparatus for improving operation of a security credential management system used for vehicle-to-vehicle communication, the apparatus comprising:
   at least one memory; and
   at least one processor coupled to the at least one memory, wherein the at least one processor is configured to:
      generate one or more linkage seeds based on a linkage seed generation key and a vehicle identifier, wherein each of the one or more linkage seeds corresponds to a random number generated at the security credential management system configured to issue pseudonym certificates;
      determine, based on a one-way function, one or more linkage values from the one or more linkage seeds, wherein the one or more linkage values are included in a corresponding pseudonym digital certificate to be used in the vehicle-to-vehicle communication;
      produce at least one encrypted linkage map that associates the one or more linkage values with the one or more linkage seeds and the vehicle identifier;
      determine that at least one linkage value from the one or more linkage values is a linkage value of interest based at least in part on information derived from misbehavior reports generated by a misbehavior authority processor of the security credential management system, each misbehavior report of the misbehavior reports including a suspect linkage value associated with a suspect vehicle and a reporter linkage value associated with a reporting vehicle;
      decrypt the at least one encrypted linkage map to identify at least one linkage seed from the one or more linkage seeds and the vehicle identifier that is associated with the linkage value of interest; and
      determine, based on the identified at least one linkage seed, whether a revocation criteria of the misbehavior authority processor is satisfied for a vehicle associated with the vehicle identifier based on a number of times the vehicle associated with the vehicle identifier has been reported as a suspect vehicle and a number of different reporting vehicles that have reported the vehicle; and
      in response to the determining that the revocation criteria of the misbehavior authority processor is satisfied, revoking the credentials of the vehicle associated with the at least one linkage seed by applying the revocation criteria.

21. The apparatus of claim 20, wherein, to determine whether the revocation criteria of the misbehavior authority processor is satisfied for the vehicle, the at least one processor is configured to:
   determine the revocation criteria of the misbehavior authority processor is satisfied for the vehicle based on a determination that the number of times the vehicle associated with the vehicle identifier has been reported as a suspect vehicle is greater than a threshold number of times and a determination that the number of different reporting vehicles that have reported the vehicle is greater than a threshold number of reporting vehicles.

22. The apparatus of claim 21, wherein the at least one processor is configured to determine, based on a determination that the revocation criteria is satisfied for the vehicle, that the at least one linkage seed is subject to revocation and publication on a revocation list.

23. The apparatus of claim 20, wherein, to produce the at least one encrypted linkage map, the at least one processor is configured to encrypt at least one linkage map with an encryption key that is derived from a pseudonym certificate authority processor encryption key (KPCA) and a registration authority processor encryption key (KRA).

24. The apparatus of claim 23, wherein, to determine the one or more linkage values from the one or more linkage seeds and produce the at least one encrypted linkage map, the at least one processor is configured to:
   implement a secure two-party computation protocol between the pseudonym certificate authority processor and the registration authority processor, wherein the secure two-party computation protocol includes providing private inputs that include the KPCA from the pseudonym certificate authority processor and the KRA from the registration authority processor.

25. The apparatus of claim 21, wherein, to utilize the one or more linkage seeds in a misbehavior identification process, the at least one processor is configured to perform a secure three-party computation protocol between a pseudonym certificate authority processor, a registration authority processor, and the misbehavior authority processor.

26. An apparatus for improving operation of a security credential management system used for vehicle-to-vehicle communication, the apparatus comprising:

at least one memory; and at least one processor coupled to the at least one memory, wherein the at least one processor is configured to:

perform a misbehavior identification process by implementing a secure three-party computation protocol between a pseudonym certificate authority processor, a registration authority processor, and a misbehavior authority processor configured to receive misbehavior reports;

determine, based on the secure three-party computation protocol, the misbehavior reports received at the misbehavior authority processor, and at least one encrypted linkage map that associates one or more linkage values with a vehicle identifier and with one or more linkage seeds from which the one or more linkage values are derived, at least one linkage seed of the one or more linkage seeds that are associated with at least one misbehaving vehicle, a linkage seed being a random number generated based on a linkage seed generation key and the vehicle identifier at the security credential management system configured to issue pseudonym digital certificates; and in response to the determining that the revocation criteria of the misbehavior authority processor is satisfied, revoking the credentials of the vehicle associated with the at least one linkage seed by applying the revocation criteria of a vehicle associated with the at least one linkage seed and the vehicle identifier based on a number of times the vehicle associated with the vehicle identifier has been reported as a suspect vehicle and a number of different reporting vehicles that have reported the vehicle.

27. The apparatus of claim 26, wherein the at least one processor is configured to:

publish, on a revocation list, the at least one linkage seed associated with the at least one misbehaving vehicle.

28. The apparatus of claim 26, wherein, in the secure three-party computation protocol, private inputs of the misbehavior authority processor include a database of suspect vehicle linkage values and reporter vehicle linkage values.

29. The apparatus of claim 28, wherein the at least one encrypted linkage map is encrypted with an encryption key that is derived from a pseudonym certificate authority processor encryption key (KPCA) and a registration authority processor encryption key (KRA), and wherein, in the secure three-party computation protocol, a private input of the pseudonym certificate authority processor is the KPCA, a private input of the registration authority processor is the KRA, and a further private input of the misbehavior authority processor is the at least one encrypted linkage map for the suspect vehicle linkage values and the reporter vehicle linkage values.

30. The apparatus of claim 26, wherein, to apply the revocation criteria to revoke credentials of the vehicle, the at least one processor is configured to:

determine the number of times the vehicle associated with the vehicle identifier has been reported as a suspect vehicle is greater than a threshold number of times;

determine the number of different reporting vehicles that have reported the vehicle is greater than a threshold number of reporting vehicles; and revoke the credentials of the vehicle based on the number of times the vehicle has been reported as a suspect vehicle being greater than the threshold number of times and the number of different reporting vehicles that have reported the vehicle being greater than the threshold number of reporting vehicles.

* * * * *